Feb. 2, 1971   C. HEIMANN   3,560,872
OPTICAL SOLID BODY LIGHT AMPLIFIER
Filed Feb. 10, 1966   3 Sheets-Sheet 1

INVENTOR.
CONRAD HEIMANN
BY
ATTORNEYS

Feb. 2, 1971 C. HEIMANN 3,560,872
OPTICAL SOLID BODY LIGHT AMPLIFIER
Filed Feb. 10, 1966 3 Sheets-Sheet 2
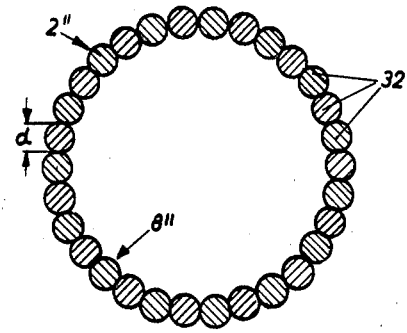
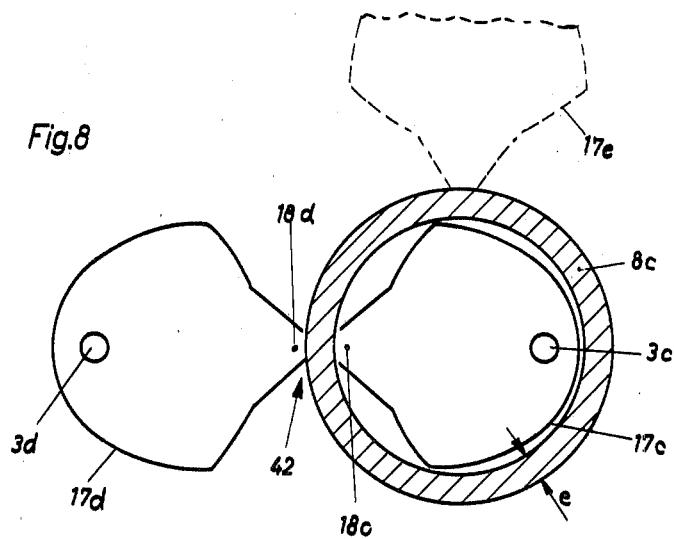
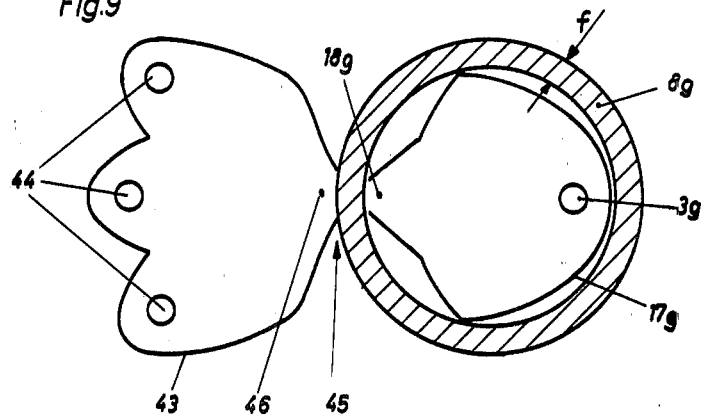
INVENTOR.
CONRAD HEIMANN
BY
ATTORNEYS

INVENTOR.
CONRAD HEIMANN

United States Patent Office 3,560,872
Patented Feb. 2, 1971

3,560,872
OPTICAL SOLID BODY LIGHT AMPLIFIER
Conrad Heimann, Bad Godesberg, Germany, assignor to Ringsdorff-Werke G.m.b.H., Bad Godesberg-Mehlem, Germany, a corporation of Germany
Filed Feb. 10, 1966, Ser. No. 526,552
Claims priority, application Germany, May 7, 1965, R 40,568
Int. Cl. H01s 3/00
U.S. Cl. 331—94.5                    17 Claims

ABSTRACT OF THE DISCLOSURE

A solid-state laser having a plurality of closely spaced and successive elongate portions of selectively fluorescent material defining a body element with polished and reflective opposite longitudinal ends. Means are provided for supporting the body element for rotation about an axis of rotation past a source of excitation light so that an internal reflection between the reflective longitudinal ends is initiated to thereby result in the production of a monochromatic coherent light in a direction longitudinally of the successive elongate portions.

---

The invention relates to an optical solid-body light amplifier, having a solid-body element of selectively fluorescent material, which can be excited by means of an excitation light beam and an optical resonator arrangement to produce a monochromatic, coherent, strongly focused beam of light.

The term "optical solid-body light amplifier" covers all of the constructions which can be provided or used either as optical amplifiers, as optical senders or as amplifiers and senders.

To accomplish a sufficiently selective fluorescence in the solid-body element of solid-body light amplifiers of this kind, also known as "lasers," the excitation energy has to be so strong that it stimulates the excited atoms to emit a coherent light beam, at least for a short interval of time, said time being so short that the thermodynamic condition of the solid-body element is not changed. The input excitation energy is far greater than the output energy. The difference is in the form of heat in the solid-body element. In these arrangements, the solid-body elements, which are in a fixed position in a commonly known solid-body light amplifier and which are always positioned almost completely in the path of the excitation light, are heated to a very high level. Because of this, the known solid-body light amplifiers can only be used either with a very small output power and with extensive cooling or by pulse operation. The range of application of a solid-body light amplifier with little output energy is naturally limited. This is true for solid-body light amplifiers which work by pulse operation only. The pulse frequency must be low in order to have sufficient time for the solid-body element to cool. Said low pulse frequency, in many cases, prevents the use of same as senders or amplifiers. In addition, the construction expense is very high because of the necessary cooling apparatus.

The purpose of this invention is to produce an optical solid-body light amplifier as described in the beginning so that it can be operated at a relatively high output energy in a pulse operation with a pulse frequency which is very high and which, in many cases, becomes almost a continuous operation. This is accomplished according to the invention by imparting to the solid-body element by means of drive apparatus a component of movement extending both transverse of the output beam and transverse to the excitation light, by limiting the cross section of the excitation light beam in the direction of said component of movement and by making the solid-body element sufficiently longer in the direction of said movement than the cross section of the excitation light beam so that selectively fluorescent material goes periodically through the excitation light during movement of the solid-body element.

The basic idea of this invention is that the selectively fluorescent material does not stay in the path of the excitation light at all times, since otherwise the excitation light must be interrupted periodically and often in order to permit a necessary cooling of the material; preferably, the solid-body element is moved through the limited path of the excitation light so that different areas of the selectively fluorescent material are exposed to the excitation light. The areas which are not within reach of the excitation light at any given time can cool off while the excited area sends out a pulse of light. This, of course, assumes that the solid-body element has a large continuous or discontinuous width to be able to expose new areas of selectively fluorescent material to the excitation light at successive intervals. The sequence of exposure of such new areas of the fluorescent material can be increased to almost any desired frequency so that it is possible to increase the pulse frequency of the output light also as desired. By overlapping of the pulses, a practically continuous output light can be achieved. The fluorescent material cools off between the intervals during which it is exposed to the excitation light and the effectiveness of cooling is enhanced by means of the movement of the material relative to the surroundings. Because of the fact that the solid-body element moves not only transversely of the excitation light beam but also transversely of the output light beam, the output light beam is always positioned at the same place. Therefore, it is possible for the first time to operate a solid-body light amplifier with a high output power and with a pulse frequency which is almost equal to a continuous beam. Thus, large new areas of application are opened to the solid-body light amplifier which until now were nonexistent.

The limitation of the cross section of the excitation light is accomplished by using an aperture stop. By this simple constructive means, a limitation of the cross section of the beam of the excitation light to the solid-body element can be achieved.

To prevent energy loss in the excitation light at the sides of a given aperture, an optical focusing device can also be provided to limit the cross section of the excitation beam. This is more expensive but is effective in minimizing loss of light energy. Further, a combination of an aperture stop with a focusing device can be used and especially good results are achieved.

The radial thickness of the selectively fluorescent material is between about 0.1 to about 3 cm. and is about 0.5 cm.

The width of the cross section of the excitation beam of light to the solid-body element equals effectively the thickness of the selectively fluorescent material.

The solid-body element can be of any desired characteristics and movement as long as it is made sure that sequential areas of the solid-body elements are moved through the excitation light in the same order. An especially simple driving mechanism is provided accordingly in a further useful construction. That is, when the solid-body element is constructed as a hollow cylinder with the axis being parallel to the output light and is connected to a rotational drive mechanism, the excitation light, having a limited cross section, is directed radially to the cylinder barrel. In this case, the solid-body element follows a circular path which is easy to control. The rotational movement has at each point in its path of movement a tangential component which extends transverse of the radially directed excitation light. Consequently, further new areas of the hollow cylinder are excited by the excitation light permitting the other areas to cool sufficiently between the emissions. The circular path of movement of the solid-body member has the special advantage that the movement occurs continuously without reversal of movement.

The cylinder barrel of the hollow cylinder can be homogeneous. This, however, can render difficult the use of some selectively fluorescent materials. Furthermore, in this case the areas of the hollow cylinder which are excited by the excitation light are not separated from those which are not yet excited. It is therefore preferred that a cylinder barrel is formed by rods which are arranged side by side and which extend parallel to the cylinder axis. The thickness of said rods is essentially equal to the width of the cross section of the excitation light. The simplification in the manufacturing of the hollow cylinder insures that only one rod at a time can be excited without influencing the neighboring rods with the fluorescence of the excited rod.

The rods can each preferably be of a cross-sectional shape comprising a sector of an annulus and said rods will be arranged with their radially extending side surfaces in contact with, or close proximity to, each other. Consequently, a good mechanical unit of the rods and a correspondingly strong hollow cylinder can be built.

The rods can also be of a circular or polygon cross section and in such case they will still be arranged together with adjacent curved or flat surfaces in contact or at each close proximity. This has the advantage that a larger surface of the rods is exposed to a surrounding cooling medium.

Another advantageous construction of the solid-body light amplifier is achieved when the solid-body element is constructed as a spider with a rotational drive applied to its central axis whereby the excitation light is directed parallel to the central axis and is restricted to a width essentially the same as the width of a spoke and which extends radially with respect to the direction of rotational movement. In this case, the solid-body element again rotates at a continuous rate and one which is easily controlled. Furthermore, the body element being constructed as a spider has the advantage that the rotating spokes cool off very well. It also ensures that only one restricted area of the fluorescent material is positioned in the path of the excitation light at a time.

Another simplified construction is accomplished by constructing the solid-body element as a disk of polygonal or circular shape which is provided with a rotational drive in engagement with the central axis thereof and by restricting the excitation light to a radially extending cross section which is narrow in the circumferential direction.

It is generally known in the field to provide the fluorescent material of solid-body light amplifiers with a coating of a good heat-conducting material. This coating carries the heat from the fluorescent material away to a cooling medium. Advantageously, by using this coating of good heat-conducting material for the solid-body light amplifier, it is effective to utilize such material in the form of cooling fins. The cooling effect of said fins at the light amplifier is enhanced by the continuous movement of the solid-body element.

To avoid a transfer of heat from one rod to another rod, the rods may be separated by heat-insulative layers which are thin in comparision to the thickness of the rods. These thin layers of heat-insulative material prevent a transfer of heat from the momentarily excited rod to the neighboring cooling rod and yet said layers because of their minute thickness, do not disturb the frequency of pulse series.

In an embodiment where the solid state elements are single rods, it is desirable to prevent escape of excitation light through the sides thereof. For this purpose, the longitudinal outer surfaces of the rods, with the exception of the part of the surface directed to the excitation light, are made reflective in such a manner that the reflective surface is directed towards the selectively flourescent material.

In the solid-body light amplifier, a movement of the solid-body element only through the surrounding air effects a cooling of said elements which can be sufficient if the pulse frequency is not too high and if the solid-body element is of sufficiently large size. However, for higher energy and pulse frequency, it is preferred if one part of the solid-body element is immersed, for at least part of its rotational movement into a liquid or gaseous cooling medium. This cooling medium directs the heat away from the nonexcited areas of the fluorescent material.

The production of the excitation light is generally known. In this embodiment, the excitation source is a cylindrical, fixed housing parallel to the axis of the cylinder barrel. The housing is provided with an elongated slot which is parallel to the light source and which forms the aperture stop. The excitation light is positioned in such a manner in the housing that a lamellar excitation light is produced which is strongly focused in cross section and which is of a uniform light intensity across its full length.

Advantageously, the inside of such housing is also made reflective and has a cross section in form of an ellipse in the area surrounding the excitation light source. An elongated source of light is positioned within or close to the first focal line of the ellipse and the major axis of the ellipse intersects the elongated slot. The elliptical cross section on both sides of the elongated slot changes to a circular shaped cross section with its central axis coinciding with the first focal line. The housing is arranged with respect to the body element in a way that the selectively fluorescent material passes through the excitation light in the area of the ellipses focal line outside of the housing. In this construction, the housing at the same time forms an aperture stop and an optical focusing device for the excitation light. Loss of excitation light does not occur since the light coming from the light source is sent partially directly by means of the elliptical section of the housing and partially by means of reflections at the circular-shaped sections of the housing to the outer focal line through which the selectively fluorescent material passes.

If an especially high concentration of excitation light is desired, two or more housings having elongated excitation light sources therein can be arranged so that their outer, second focal lines essentially coincide and that between them in the area of the outer focal line, an opening is provided for the solid-body element.

A space saving arrangement for light amplifiers with hollow cylindrical solid-body elements is achieved if a light source housing is arranged within the hollow cylinder. However, if a higher concentration of excitation light is desired, one or more housings can be arranged simultaneously or selectively outside of the hollow cylinder.

The solid-body light amplifier, according to the invention, can produce two or more monochromatic, coherent, strongly focused output beams at the same time. For this and according to a further embodiment of the invention, two or more excitation light beams are provided with a limited cross section of the beam directed toward the solid-body element. Said excitation light beams fall onto the solid-body element to produce two or more output light beams. The same solid-body element, which is of one or more parts, in this case, is used to produce two or more output light beams whereby generally, in comparison to the use of separate solid-body light amplifiers for each output beam, an essentially simplified construction is achieved.

If the body element is constructed as a spider, the elongated excitation light, the housing and the elongated slot for producing two output light beams are of such a length that on both sides of the central axis an excitation light beam is provided through which the spokes of the body element pass. It is, of course, possible to change the direction of the output light by means of optical deflector elements so that they leave the light amplifier parallel to each other or at any other desired angle.

The solid-body element as well as each excitation source of light can be cooled by a liquid or gaseous medium.

In this case it is provided advantageously that the solid-body element and each excitation source are cooled by means of cooling streams, which are separated from each other by wall means which preferably is pervious only to the excitation light and which is at the same time a heat insulation. In this case, the cooling means, in view of its physical characteristic and especially its temperature can be adjusted to the differing cooling requirement at the solid-body element and at the excitation light source.

By using an excitation source of light which operates intermittently in a generally known fashion, it is provided that its pulse frequency and the speed of movement of the solid-body element are synchronized so that either one rod or one spoke is positioned in the excitation light when same is energized. Said synchronizing of movement of the solid body results in an optimum use of energy with a minimum of heat production.

Examples of construction of the invention are shown in the drawings.

In the drawings:

FIG. 5 is a cross-sectional view according to FIG. 4 of another modified solid-body element.

FIG. 8 is a schematic cross-sectional view of a light amplifier having several excitation light sources.

FIG. 9 is a cross-sectional view of FIG. 8 having a modified arrangement of the excitation light sources.

Figure 1:
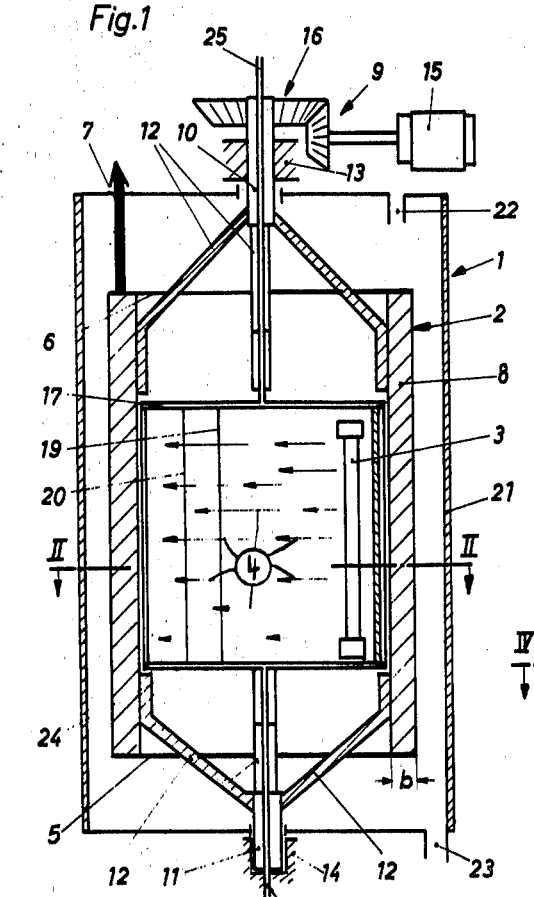
FIG. 1 is a partially schematical longitudinal cross-sectional view of the solid-body light amplifier according to the invention.
Figure 2:
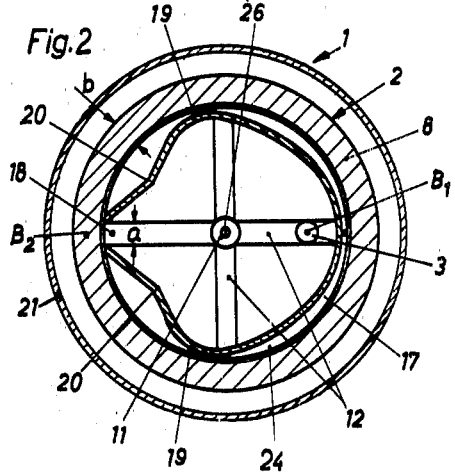
FIG. 2 is a cross-sectional view of a light amplifier taken along the line II—II of FIG. 1.

In FIGS. 1 and 2, 1 generally is an optical solid-body light amplifier according to the invention. Same is provided with a body element 2 of selectively fluorescent material, or more particularly of active laser material preferably of doped monocrystal, namely synthetic ruby. Any other desired materials, for instance, doped glass or plastic with so-called laser characteristics can be used. This does not only apply to the solid-body element of the light amplifier according to FIGS. 1 and 2, but applies to all body elements described herein.

For excitation of the body element 2, a source of light 3 is used which sends out excitation light indicated by the arrows 4.

The solid-body element 2 comprises an optical arrangement of resonators which in the illustrated embodiment is constructed so that its end faces 5 and 6 are planar and polished and coated to reflect light. The reflective surface 5, for instance, reflects completely while the reflective surface 6 is partially transmitting.

By means of the excitation light 4, the material of the solid-body element 2 is excited to a selective fluorescence, which finally results in the sending of an output light beam 7 by means of the optical resonance effect at the reflective surfaces 5 and 6, which is monochromatic, coherent and strongly focused. The details of the development of the output light, especially the excitation light power, and means necessary for producing an output light of a predetermined power are not discussed here, because same are generally known, and differ depending on the material of the solid-body element 2.

According to the invention, the solid-body element 2 moves periodically through a fixed excitation beam of light having a width which is restricted in the direction of the solid-body element.

For this purpose, according to FIGS. 1 and 2, the solid-body element 2 is constructed as a hollow cylinder 8 having an axis extending parallel to the output light 7. The hollow cylinder 8 is rotatable around its axis by means of a drive device 9. The hollow cylinder 8 is connected to pintles 10 and 11 which are supported in their inner portion by arms 12. The pintles 10 and 11 are received into bearings 13 and 14. The drive device 9, for instance, can be an electric motor 15 which is engageable with the pintle 10 by means of a transmission 16.

To produce an excitation light beam of limited diameter in the peripheral direction of the hollow cylinder 8, the excitation light source 3 is arranged in a housing 17 which is of cylindrical shape. The excitation light source itself is rod-shaped and extends parallel to the axis of the hollow cylinder 8. According to the example of construction in FIGS. 1 and 2, the housing 17 is positioned inside of the hollow cylinder 8 and fills same. The excitation light source 3 can be of the electric flash tube or fluorescent tube variety.

The cylindrical housing 17 is provided with an elongated slot 18 which limits the cross section of the excitation light 4 in peripheral direction of the hollow cylinder 8 to width "$a$." Consequently, the elongated slot 18 is analogous to an aperture stop for the excitation light 4.

To prevent escape of the excitation light, the housing 17 is provided with the following cross section:

Between the surface elements 19 (left side in FIG. 2) the cross section of the housing 17 is elliptically shaped. The excitation source of light 3 is positioned in or close to the one focal line $B_1$. The second focal line $B_2$ is positioned outside of the housing 17 between the inner and outer surfaces of the cylinder 8 but preferably midway between the two surfaces. From the point 19 to the point 20, the cross section of the housing 17 extends in a circular shape having a center point coinciding with the inner focal line $B_1$. Starting at the point 20 the cross section of the housing 17 is tapered inwardly towards the elongated slot 18. The excitation light intersecting the focal line $B_2$ comprises a small part coming directly from the source 3 and a larger part which is reflected onto the focal line $B_2$ by the elliptical housing surface 19—19. The remaining portion of the light comes from the reflection at the circular arc sections 19–20 to the elliptical section 19—19 and then out to the focal line $B_2$. Consequently, all the light is sent by the excitation light source 3 into the selectively fluorescent material of the hollow cylinder 8 and excites same to send monochromatic, coherent, strongly focused light. Thus, the housing 17 is an optical focusing device which acts together with the aperture stop. It is presumed that the inner surfaces of the housing 17 are reflective. The housing 17 extends lengthwise across a major part of the hollow cylinder 8. The housing 17 can be constructed longer or shorter as desired.

The solid-body element 2 is enclosed in a cooling housing 21 having inlet and outlet ports 22 and 23. The ends of the housing are made of a transparent material so that the output light 7 can pass therethrough. A liquid or gaseous cooling means can be sent through the cooling housing 21 which conducts the heat existing in the hollow cylinder 8 out of the hollow cylinder. Said cooling means at the same time cools the excitation light source 3.

Since the cooling requirements for the excitation light source 3 and the selectively fluorescent matreial of the solid-body element 2 are generally different, it is better if the excitation light source 3 and its housing 17 are surrounded by a second cooling housing 24 which at least in the region of the excitation light beam 4 is made of a transparent material and which at the same time is made of heat insulating material. Liquid and gaseous cooling means for cooling of the excitation light source 3 can also be led through the second cooling housing 24 by means of axial conduits 25 and 26. In this case, the two cooling means are completely separated. Cooling means, for instance, can be gases, as air, especially in liquid form.

Figure 3:
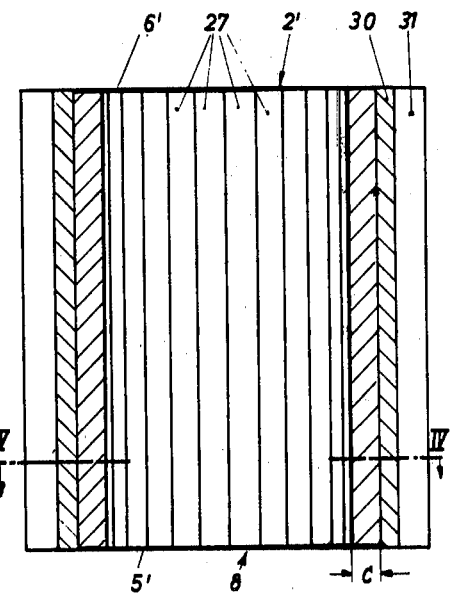
FIG. 3 is a longitudinal cross-sectional view of a different solid-body element as shown in FIG. 1.
Figure 4:
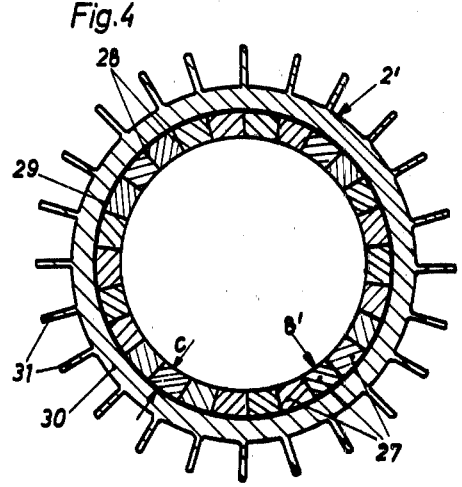
FIG. 4 is a cross-sectional view of a solid-body element taken along the line IV—IV of FIG. 3.

In place of the solid-body element 2, a body element 2', as shown in FIGS. 3 and 4, can also be used in the light amplifier of FIGS. 1 and 2. Here the selectively fluorescent material is provided by means of rods 27 which are of a cross section comprising segments of an annulus and which are placed side by side so that same form together a closed hollow cylinder 8'. Said cylinder again is provided with reflective surfaces at its end surfaces 5' and 6'. The single rods are separated by thin, heat-insulative layers 28 which can be as reflective at its outer surface as at the outer surfaces 29 of the rods 27. The hollow cylinder 8' is surrounded by a housing 30 of a good heat-conducting material, for instance copper or silver. The housing 30 has cooling fins 31 around its periphery.

A further solid-body element 2" which could be used for the light amplifier of FIGS. 1 and 2 is shown in FIG. 5. There the selectively fluorescent material is provided by means of rods 32 having a circular cross section, which are placed side by side around a circle so that they together form a hollow cylinder 8. The hollow cylinder 8''' can also be provided with a housing of good heat conducting material. It is also possible to supply heat-insulative layers between and a mirroring of the rods 32.

Figure 7:
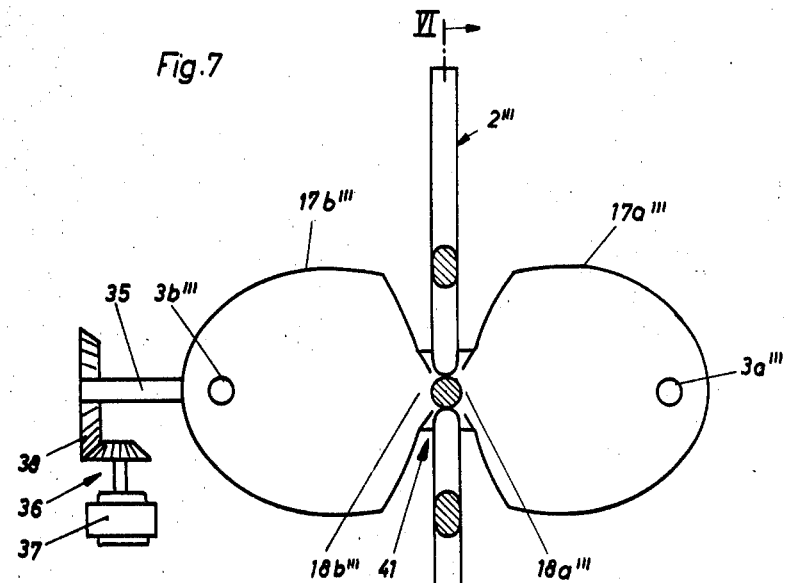
FIG. 7 is a vertical-sectional view of the light amplifier taken along the line VII—VII of FIG. 6.
Figure 6:
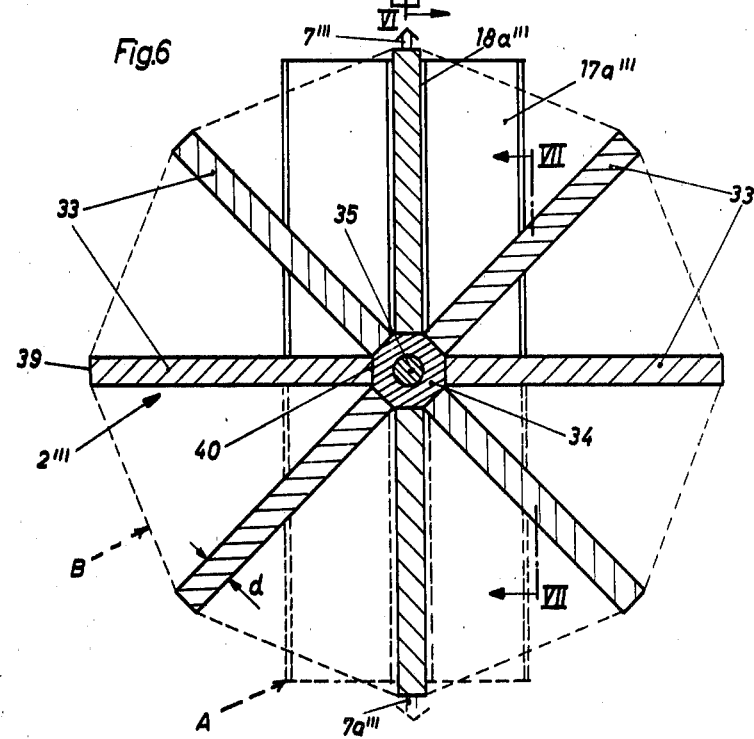
FIG. 6 is a sectional view of a modified example of construction of the solid-body light amplifier according to the invention.

In the example of construction according to FIGS. 6 and 7, a body element 2''' is provided which has the features of a spider.

The selectively fluorescent material forms star-shaped spokes 33 equally spaced around the hub 34. A shaft 35 is connected to the hub 34. The shaft is engageable with a rotational drive 36 which can consist of an electric motor 37 and a transmission 38. The spokes 33 are provided with reflective surfaces 39 and 40 at their ends.

For production of the excitation light, two sources of excitation lights $3a'''$ and $3b'''$ are provided and arranged in the housing $17a'''$ and $17b'''$. The construction of the excitation light source and the housing is the same as shown in FIGS. 1 and 2 so further detailed description is not necessary. The housings $17a'''$ and $17b'''$ are opposed to each other so that their outer focal lines coincide. The common outer focal line is positioned in the area of the slot 41 which is positioned between the slots $18a'''$ and $18b'''$ and which makes possible intersection of the spokes 33 during rotation of the solid-body element 2''' by light emanating from said facing slots. The spokes 33, in this case, pass between the two opposed excitation lights. The output light beam leaves the apparatus at 7'''. The housings $17a'''$ and $17b'''$ having rod-shaped excitation lights $3a'''$ and $3b'''$ can extend along the length of only one spoke 33. Thus, only one output light is produced at 7'''. However, it is also possible to extend one or both of the housings having excitation lights across the full diameter of the spider so that the housing has the added portion shown by the added broken lines "A" in FIG. 6. In this case, two diametrically opposed spokes are excited and an additional output light $7a'''$ is produced. Said output light can be redirected by optical deflector or reflector elements so that it leaves the arrangement parallel to the output light 7''' or at any desired angle to same.

A further example of two opposed housings, similar to FIGS. 6 and 7, with excitation light sources and with coinciding outer focal lines is also possible with the hollow cylindrical body element as shown in FIG. 8. There, a hollow cylinder $8c$ is shown with a first housing $17c$ having an excitation light source $3c$ inside of same. A second housing $17d$ is outside of the hollow cylinder $8c$ having an excitation light source $3d$ opposed to the housing $17c$. The hollow cylinder $8c$ extends through a slot 42 between the two elongated slots $18c$ and $18d$. The broken lines shown in FIG. 8 indicate the possible arrangement of another housing $17e$ circumferentially offset from housing $17d$ so that the material of the hollow cylinder $8c$ can be excited to a selectively fluorescence at two places resulting in two output beams of light being produced.

Finally, another possibility is indicated in FIG. 9 wherein housing $17g$ is arranged within a hollow cylinder $8g$ of selectively fluorescent material. The housing $17g$ is provided with an excitation light source $3g$, corresponding to the housing and excitation light source 3 in FIGS. 1 and 2. The outer housing 43 is provided with 3 excitation light sources 44, their focal beams being essentially concentrated on the outer focal line of the housing $17g$ due to the appropriately formed inner surfaces of the housing 43. In this case too, the hollow cylinder $8g$ extends through a slot 45 between the elongated slot $18g$ and the elongated slot 46. This results in a larger concentration of excitation light being obtained.

In all cases the width, shown by "$a$" in FIG. 2, of the elongated slot which limits the cross section of the beam of the excitation light to the body element is intended to be essentially equal to the thickness of the body element, said thickness is the wall thickness "$b$" of the hollow cylinder 8 in FIGS. 1 and 2. The width "$a$" of the beams of excitation light 4 is equal to the radial thickness "$c$" of the rods 27 in FIGS. 3 and 4 and, in FIG. 5, the diameter "$d$" of the spokes 33 and finally in FIGS. 8 and 9 the wall thickness "$e$" and "$f$" of the hollow cylinder $8c$ and $8b$, respectively. The corresponding measurements are, advantageously, between 0.1 and 3 cm. The sizes of the solid-body elements have to be chosen, as is commonly known, according to the technique used with light amplifiers. In so far as somewhat arbitrary dimensions are used in the drawings, same can be changed as needed.

The working principle is the same for all described embodiments:

The rotatable body elements 2, 2', 2'', 2''' pass transversely through the focal line of the excitation light. Thus, single elongated lengthwise elements of the hollow cylinder 8, $8c$ or $8e$ or of the rods 27 or 32, or of the spokes 33, are exposed periodically to the excitation light. During this period, an output light is produced in the respective section of the selectively fluorescent material. Thus, the output light at all times exits from the light amplifier at a single location. Each area of the cylinder, or each rod or spoke, appears one after the other to send out a pulse of coherent light and between the pulses enough time is allowed for cooling of the selectively fluorescent material.

The number of rotations of the respective body element has to be adjusted to the desired pulse frequency. Same can be so high that practically a continuous output light is produced.

The following data is given only as an example of the rotation speed corresponding to the construction of FIGS. 1 and 2:

The modern light amplifiers have a pulse frequency of 0.2 to 12,000 pulses per minute. (An example for optical solid-body senders with a very low pulse frequency and with a ruby as the selectively fluorescent material is given by J. P Wilson in "Internationale Electronische Rundschau," 1964, No. 11, p. 621. An example for an optical solid-body light amplifier with a relatively high series of pulses is given by H. D. vom Stein in "Wehrtechnische Montatshefe," edition 8, August 1963, page 309). The time of a single pulse is $10^{-7}$ seconds to several milliseconds. According to Sy. Vogel and L. H. Dulberger (Electronics Edition of 10–27–61) the time of a single pulse of a ruby of selectively fluorescent material is about 500 µs.; that means that 2,000 pulses per second would be possible, theoretically without an overlapping of the single pulses.

The selectively fluorescent material and the arrangement together with the excitation light source and the cooling are chosen so that 40 pulses of the monochromatic, coherent, strongly focused light are possible per second. Since the pulse time is 500 µs., this means that 2,000 pulses per second are possible, without an overlapping of the single pulses and without having spikes between said pulses.

To obtain 2,000 pulses per second the body element of FIG. 5 is, for instance, put into the apparatus of FIGS. 1 and 2 so that fifty rods 32 form the hollow cylinder 8" and that said hollow cylinder rotates with 40 r.p.s.

The excitation light source can send out a continuous beam of excitation light at the body element 8, 8c and 8g. If the body element is constructed of different single rods, spokes or the like, it is advantageous to use excitation lights which work with pulses. The frequency of the excitation light source thereby has to be equal to the number of single rods in the body element divided by the time for one rotation of the body element so that always one rod or one spoke is positioned in the path of the excitation light, when it is pulsed. The drive, for example, can be constructed as step drive.

The light amplifier can be used very well to produce the so-called "giant pulse" which has a peak output higher than ten to the sixth power of the other pulses, in the normal use of pulses for solid-body light amplifiers. Using the described example of a hollow cylinder comprising fifty single rods of selectively fluorescent material and rotating with 40 revolutions per second to produce giant pulses, for instance, by interposing a Kerr-cell as an optical shutter between the selectively fluorescent material and one of the reflectors of the optical resonator and by assuming the values written below, the following data are achieved:

Retardation time between the start of the excitation pulse and the aperture opening for the Kerr-cell shutter about 0.5 ms.

Peripheral speed of the hollow cylinder 8" according to FIG. 5 which is provided with fifty single rods with a diameter of 0.5 cm.=$10^3$ cm./s.

Path of a rod of the selectively fluorescent material with the retardation time (about 0.5 ms.) between excitation pulse and opening of the Kerr-cell shutter=0.5 cm.

Said path in the foregoing example equals the diameter "$d$" of a rod so that at the start of the giant pulse the next rod of the hollow cylinder 8" comprised of fifty rods is positioned in front of the elongated slot to receive the excitation pulse of the excitation light source. Consequently, and as a result of this construction, a series of giant pulses is possible with the oscillation time $T$=0.5 ms.

By increasing the number of the single rods in the circumference of the hollow cylinder and by increasing the number or rotations per second of the hollow cylinder, a decrease in the oscillation time T is possible, resulting, using the proper number of single rods and number of rotations of said hollow cylinder consisting of these single rods, in a series of giant pulses, with which the oscillation time becomes equal or less than the pulse duration ($T \leq \tau$).

(Path of a rod during the opening time of .02 µs. of the Kerr-cell shutter=$2 \times 10^{-5}$ cm.)
(Path of a rod during the time of a giant impulse of 0.2 µs.=$2 \times 10^{-4}$ cm.)

The invention is not to be limited to the embodiments illustrated. Especially it would be possible to design the solid-body elements as a cylindrical cage whose longitudinal elements are made of selectively fluorescent material.

In this way, an even better cooling effect could be accomplished because the rods can be cooled from all sides. In case a rotational movement of the solid-body elements is not wanted, same can reciprocate transversely. For instance, for this purpose said solid-body elements can be assembled as a grid of parallel rods made of a selectively fluorescent material. Said grid can be reciprocated with a linear speed. Furthermore, it is possible to adjust for the deviation thereof from a linear speed in the zones of reversal of the grid by changing the spacing of the rods.

In place of a rotating spider, a homogeneous rotatable disk of a circular or polygon-shape can be used as is indicated by broken lines B in FIG. 6.

In hollow cylinders or cylindrical housings made of rods assembled together, rods of any desired cross section, primarily of a polygon cross section, can be utilized.

The construction of the optical resonator can be as desired. Particularly, a prism can be ground or added at or adjacent the respective end surfaces, instead of reflective surfaces at said surfaces, which prisms consist of the same material as the solid-body element and which are wholly reflective. The reflectors of the optical resonator can be mounted in spaced relation to the body element in adjustable holders, if desired.

It is also within the scope of the general idea of the invention that the solid-body elements are arranged in a fixed position and that the excitation light source rotates or moves in other patterns, with the device for limiting the excitation focused beam. However, in such case the output light is not transmitted from a single location so that optical prisms or reflecting devices have to be provided which control the direction of the output light.

Finally all characteristics of the description and the drawings, including their constructive details, can be used in any desired combination.

What is claimed is:

1. A solid state laser comprising:
   a closed hollow cylindrical body element, said body element being comprised of a plurality of close packed, elongate rods of active laser material, said rods each having polished and reflective opposite longitudinal ends, one of said ends being semi-reflective to permit light output, said rods being arranged in closely adjacent, side-by-side relationship and defining a circumferentially continuous shell, the separation of the axes of adjacent rods closely approximating the width of said rods as measured circumferentially of the cylindrical body elements, the interiorly facing surfaces of said rods defining the inner surface of said shell;
   a rod-shaped source of excitation light substantially parallel to said elongate rods and disposed within said shell eccentrically thereof and adjacent one portion of the interior wall thereof;
   a reflector housing disposed within said shell and axially aligned therewith, said reflector housing surrounding and being fixed with respect to said light source, said reflector housing comprising in cross section a first portion comprising one end of an ellipse having near and far focal points, said light source paralleling the longitudinal axis of said housing and being located adjacent said first portion of said housing at the near focal point thereof, said reflector housing having an opposed pair of second portions of semi-circular, inwardly concave cross section extending from the ends of said first portion and extending toward each other, said semi-circular second portions being spaced from said light source further than are any points on said first portion, said semi-circular second portions being equidistant from and centered on said near focal point for reflecting light from said source back through said near focal point to said first portion, said reflector housing still further including an opposed pair of third portions of substantially linear cross section which extend from the free ends of said second portions and converge toward each other, the free ends of said third portions being spaced to define a narrow slot through the wall of said reflector housing at the location thereon most remote from said light source; said first portion, said second portions and said third portions being symmetrically located with respect to a line between the near and remote focal points of said first portion, said slot being centered on said line between said focal points and adjacent said far focal point, said light source producing a beam of excitation light through said slot;

means for supporting said shell for rotation about an axis coincident with geometric axis of said shell;

driving means for rotating said shell about said axis of rotation and with respect to said light source and reflector housing located therwithin for bringing successive ones of said rods into opposition with said slot thereby to effect successive energization of said rods for producing monochromatic coherent light pulses in a direction axially of each so energized rod.

2. A solid state laser construction comprising:

an elongate, rod-like light source;

an elongate reflector housing surrounding and fixed with respect to said light source, said reflector housing comprising in cross section a first portion comprising one end of an ellipse having near and far focal points, said light source paralleling the longitudinal axis of said housing and being located adjacent said first portion of said housing at the near focal point thereof, said reflector housing having an opposed pair of second portions of semi-circular, inwardly concave cross section extending from the ends of said first portion and extending toward each other, said semicircular second portions being spaced from said light source further than are any points on said first portion, said semi-circular second portions being equidistant from and centered on said near focal point for reflecting light from said source back through said near focal point to said first portion, said reflector housing still further including an opposed pair of third portions of substantially linear cross section which extend from the free ends of said second portions and converge toward each other, the free ends of said third portions being spaced to define a narrow slot through the wall of said reflector housing at the location thereon most remote from said light source; said first portion, said second portions and said third portions being symmetrically located with respect to a line between the near and remote focal points of said first portions, said slot being centered on said line between said focal points and adjacent said far focal point, said light source producing a beam of excitation light through said slot;

a body element including a plurality of rod-like portions of active laser material parallel to said slot and tight source, said rod-like portions having width and thickness dimensions substantially similar to the width of said slot, each rod-like portion having polished and reflective opposite longitudinal ends, one of said ends being semi-reflective to permit light output;

means moving said rod-like portions sequentially past said slot and through the far focal point of said first housing portion for briefly energizing each said rod-like portion with light from said slot and thereby causing each said rod-like portion in sequence to produce monochromatic light.

3. A solid-state laser according to claim 1, wherein a plurality of said reflector housings having rod-shaped excitation lights are arranged such that said far focal points thereof essentially coincide and said successive elongate rods are driven between said elongated slots thereof.

4. A solid-state laser according to claim 2, wherein said body element is a hollow cylinder; and wherein said excitation light beam is directed radially of said cylinder, said reflector housing limiting the beam in the circumferential direction of said cylinder, whereby said successive rod-like portions thereof are stimulated to produce monochromatic coherent light.

5. A solid-state laser according to claim 4 wherein said reflector housing is provided internally of said hollow cylinder and substantially fills same.

6. A solid-state laser according to claim 4, wherein said hollow cylinder is made up of rods arranged side by side around the circumference of said cylinder.

7. A solid-state laser according to claim 1, wherein said rods have a polygon-shaped cross section, their side surfaces engaging each other to define said hollow cylindrical body element.

8. A solid-state laser according to claim 1, wherein said plurality of rods are separated by heat-insulating members which are thin in comparison to said rods.

9. A solid-state laser according to claim 1, wherein the outer surfaces of said rods, with the exception of the internally facing portions thereof facing said excitation light beam, are reflecting surfaces reflecting the excitation light beam toward the interior of said body element.

10. A solid-state laser according to claim 4, wherein at least one further reflector housing having rod-shaped excitation lights therein is arranged externally of said hollow cylinder.

11. A solid-state laser according to claim 1, wherein said hollow cylindrical body element and said source of excitation light are separated from each other by a heat-insulating transparent member.

12. A solid-state laser according to claim 1 including cooling means for cooling both said moving body element and said excitation light by a fluid cooling medium.

13. A solid-state laser according to claim 1, wherein two or more focused excitation light beams are provided, each with its cross section limited in the direction of movement of said body element and each being periodically passed by said successive parts of said body element for production of two or more output beams.

14. A solid-state laser according to claim 2, wherein said body element is a spider having a rotating drive around its center axis, each spoke of said spider extending in a longitudinal direction; and wherein said excitation light beam is arranged radially of said center axis, its cross-sectional width being essentially equal to the width of each spoke, whereby said spokes are excited to produce said monochromatic coherent light.

15. A solid-state laser according to claim 14 wherein said rod-shaped light source, said reflector housing and said elongated slot are each of such a length on both sides of said center axis of said spider that one excitation light beam is produced and said spokes of said body element pass thereby.

16. A solid-state laser according to claim 1, wherein said hollow cylindrical body element is encompassed by a heat-conducting material having cooling fins thereon for transmitting the heat generated by said hollow cylindrical body element away from said hollow cylindrical body element.

17. A solid-state laser according to claim 1 wherein said plurality of rods have a circular cross section, their surfaces engaging each other along a line to define said hollow cylindrical body element.

References Cited

UNITED STATES PATENTS

| | | | |
|---|---|---|---|
| 2,298,947 | 10/1942 | Leverenz | 331—94.5UX |
| 3,059,117 | 10/1962 | Boyle et al. | 331—94.5X |
| 3,102,920 | 9/1963 | Sirons | 331—94.5UX |
| 3,171,031 | 2/1965 | Yariv | 331—94.5X |
| 3,179,898 | 4/1965 | Meltzer | 331—94.5 |

(Other references on following page)

UNITED STATES PATENTS

| | | | |
|---|---|---|---|
| 3,201,708 | 8/1965 | Burstein | 331—94.5UX |
| 3,222,615 | 12/1965 | Holly | 331—94.5 |
| 3,233,944 | 12/1965 | Luck, Jr., et al. | 331—94.5 |
| 3,270,290 | 8/1966 | Maurer | 331—94.5 |
| 3,278,283 | 10/1966 | Bazinet, Jr. | 331—94.5UX |
| 3,310,753 | 3/1967 | Burkhalter | 331—94.5 |
| 3,311,844 | 3/1967 | Di Curcio | 331—94.5 |
| 3,339,150 | 8/1967 | Bownes | 331—94.5 |
| 3,391,281 | 7/1968 | Eerkens | 331—94.5X |
| 3,399,359 | 8/1968 | Ott et al. | 331—94.5 |

FOREIGN PATENTS

| | | | |
|---|---|---|---|
| 1,379,289 | 10/1964 | France | 331—94.5 |
| 1,170,546 | 5/1964 | Germany | 331—94.5 |
| 1,183,597 | 12/1964 | Germany | 331—94.5 |

RONALD L. WILBERT, Primary Examiner

W. A. SKLAR, Assistant Examiner